US009734765B2

(12) United States Patent
Kwon et al.

(10) Patent No.: US 9,734,765 B2
(45) Date of Patent: Aug. 15, 2017

(54) DISPLAY DEVICE AND DRIVING METHOD THEREOF

(71) Applicants: Samsung Display Co., Ltd., Yongin, Gyeonggi-Do (KR); Korea Advanced Institute of Science and Technology, Daejeon (KR)

(72) Inventors: Oh Jo Kwon, Suwon-si (KR); Choong Sun Shin, Yongin-si (KR); Hyun Sik Kim, Daejeon (KR); Jun Suk Bang, Daejeon (KR); Gyu Hyeong Cho, Daejeon (KR)

(73) Assignees: Samsung Display Co., Ltd., Yongin-si (KR); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 14/301,311

(22) Filed: Jun. 10, 2014

(65) Prior Publication Data

US 2015/0138177 A1 May 21, 2015

(30) Foreign Application Priority Data

Nov. 18, 2013 (KR) ........................ 10-2013-0140198

(51) Int. Cl.
*G06F 3/038* (2013.01)
*G09G 5/00* (2006.01)
(Continued)

(52) U.S. Cl.
CPC ......... *G09G 3/3291* (2013.01); *G09G 3/3233* (2013.01); *G09G 2300/0819* (2013.01);
(Continued)

(58) Field of Classification Search
CPC ........... G09G 3/3233; G09G 2320/043; G09G 2320/045; G09G 2300/043; G09G 2320/029; G09G 3/3258; G09G 2320/0214
See application file for complete search history.

(56) References Cited

U.S. PATENT DOCUMENTS 8,115,707 B2 2/2012 Nathan et al.
8,269,803 B2 * 9/2012 Yoo ...................... G09G 3/3233 345/690

(Continued)

FOREIGN PATENT DOCUMENTS

KR 10-2011-0088745 A 8/2011
KR 10-1073297 B1 10/2011

*Primary Examiner* — Michael J Jansen, II
(74) *Attorney, Agent, or Firm* — Lewis Roca Rothgerber Christie LLP

(57) ABSTRACT

A display device includes: a plurality of pixels, each being coupled to a corresponding data line among a plurality of data lines and a corresponding scan line among a plurality of scan lines; a scan driver to supply a scan signal to the scan lines; a sensor coupled to the pixels and the data lines and configured to detect a sensing current according to a test signal input to the data lines; and a controller configured to detect a pixel current of a pixel corresponding to a scan line to which the scan signal is supplied, by using a first sensing current corresponding to a first pixel and a second sensing current corresponding to a second pixel, when the scan signal is selectively supplied to a first scan line coupled to the first pixel and a second scan line coupled to the second pixel.

13 Claims, 6 Drawing Sheets

(51) Int. Cl.
*G09G 3/3291* (2016.01)
*G09G 3/3233* (2016.01)

(52) U.S. Cl.
CPC ............... *G09G 2310/0251* (2013.01); *G09G 2320/0233* (2013.01); *G09G 2320/0285* (2013.01); *G09G 2320/0295* (2013.01); *G09G 2320/043* (2013.01)

(56) References Cited

U.S. PATENT DOCUMENTS

| | | | | |
|---|---|---|---|---|
| 8,599,224 | B2 * | 12/2013 | Yoo | G09G 3/3233 345/212 |
| 2007/0290969 | A1 * | 12/2007 | Hsu | G09G 3/3696 345/89 |
| 2010/0097360 | A1 * | 4/2010 | Cho et al. | 345/205 |
| 2011/0050674 | A1 * | 3/2011 | Kim | G09G 3/3233 345/211 |
| 2011/0205250 | A1 * | 8/2011 | Yoo | G09G 3/3233 345/690 |
| 2011/0254871 | A1 * | 10/2011 | Yoo | G09G 3/3233 345/690 |
| 2011/0279444 | A1 * | 11/2011 | Chung et al. | 345/214 |
| 2014/0361961 | A1 * | 12/2014 | Takahara | G09G 3/006 345/76 |
| 2015/0103062 | A1 * | 4/2015 | Kwon | G09G 3/3291 345/212 |

* cited by examiner

DISPLAY DEVICE AND DRIVING METHOD THEREOF

CROSS-REFERENCE TO RELATED APPLICATION

This application claims priority to and the benefit of Korean Patent Application No. 10-2013-0140198 filed in the Korean Intellectual Property Office on Nov. 18, 2013, the entire contents of which are incorporated herein by reference.

BACKGROUND

1. Field

Embodiments of the present invention relate to a display device and a driving method thereof.

2. Discussion of the Background

An organic light emitting diode display, among flat panel displays, uses an organic light emitting diode which generates light by recoupling electrons and holes to display an image. Since the organic light emitting diode display has a fast response speed, is driven with low power consumption, and has excellent luminous efficiency, luminance, and viewing angle, the organic light emitting diode display has received attention.

In general, the organic light emitting diode display is classified into a passive matrix organic light emitting diode display (PMOLED) and an active matrix organic light emitting diode display (AMOLED), according to a driving mode of the organic light emitting diode.

From the viewpoint of resolution, contrast, and operation speed, the active matrix organic light emitting diode display (AMOLED), which emits light selected for each unit pixel, has become mainstream.

In one pixel of the active matrix organic light emitting diode display, a light emission degree of the organic light emitting diode is controlled by controlling a driving transistor which supplies driving current to the organic light emitting diode according to a data voltage.

However, in the organic light emitting diode display, a difference in characteristics such as an operation voltage Vth and mobility of a driving transistor for each pixel due to a process deviation and the like occurs, and thus a current amount driving the organic light emitting diode is changed, and as a result, a difference in luminance among the pixels occurs.

In order to solve the problem, a current of each pixel is measured and then a data compensating method of compensating input data according to the measured result has been researched. However, in a display panel, various noises, such as a ripple of an electric wire and a leakage current due to another parasitic component other than the pixel, exist. Accordingly, there is a problem in that it is difficult to exactly measure the pixel current.

The above information disclosed in this Background section is only for enhancement of understanding of the background of the invention and therefore it may contain information that does not form the prior art that is already known to a person of ordinary skill in the art.

SUMMARY

One aspect of embodiments of the present invention is a display device and a driving method thereof capable of accurately (e.g., exactly) measuring a pixel current of each pixel in order to compensate for a difference in luminance among pixels.

Another aspect of embodiments of the present invention is a display device and a driving method thereof that does not use a separate feedback line for measuring the pixel current.

Further, other technical aspects desired to be achieved in embodiments of the present invention are not limited to the aforementioned objects, and other technical aspects not described above will be apparent to those skilled in the art from the disclosure.

According to an embodiment of the present invention, there is provided a display device including: a plurality of pixels, each of the plurality of pixels being coupled to a corresponding data line among a plurality of data lines and a corresponding scan line among a plurality of scan lines; a scan driver to supply a scan signal to the plurality of scan lines; a sensor coupled to the plurality of pixels and the plurality of data lines and configured to detect a sensing current according to a test signal input to the plurality of data lines; and a controller configured to detect a pixel current of a pixel from among the plurality of pixels corresponding to a scan line from among the plurality of scan lines to which the scan signal is supplied, by using a first sensing current corresponding to a first pixel from among the plurality of pixels and a second sensing current corresponding to a second pixel from among the plurality of pixels which are detected by the sensor, when the scan signal is selectively supplied to a first scan line from among the plurality of scan lines coupled to the first pixel and a second scan line from among the plurality of scan lines coupled to the second pixel.

The pixel current may be detected by comparing the first sensing current and the second sensing current.

The display device may further include a data driver to supply a data signal to the plurality of data lines, wherein the scan driver is configured to supply the scan signal to the first scan line and the second scan line so that the data signal is concurrently supplied to the first pixel and the second pixel.

The display device may further include: a power voltage supplier to supply a power voltage to the pixel; and a driving transistor driven according to the data signal and the power voltage so that the pixel emits light.

The sensor may include a sensing capacitor to generate a sensing voltage according to the sensing current; and a comparator to output a pixel voltage corresponding to the pixel current by comparing a first sensing voltage corresponding to the first sensing current and a second sensing voltage corresponding to the second sensing current.

The sensor may further include: an amplifier to generate an output voltage according to a difference between voltages input to a plurality of input terminals; an output terminal coupled to the amplifier and configured to supply the test signal to the data line by using a plurality of transistors driven according to the output voltage; a first switching element coupled to the output terminal and driven so that the sensing current is applied to the sensing capacitor; and a second switching element coupled to the comparator and driven so that the first sensing voltage and the second sensing voltage are applied to the comparator.

The plurality of transistors may include a first transistor of which one end is coupled to a voltage source and another end is coupled to the data line and an input terminal of the amplifier through a first node; and a second transistor of which one end is coupled to the sensing capacitor and another end is coupled to the first node.

The first transistor may operate by the output voltage to supply a current supplied from the voltage source to the first node.

The display device may further include: a data compensator to compensate for the data signal supplied to the pixel as a compensation value corresponding to the detected pixel current value.

A driving method of a display device including a plurality of pixels, each of the pixels coupled to a corresponding data line from among a plurality of data lines and a corresponding scan line from among a plurality of scan lines, the method including: selectively supplying a scan signal to a first scan line coupled to a first pixel and a second scan line coupled to a second pixel; applying a test signal to a first data line corresponding to the first pixel and to a second data line corresponding to the second pixel; detecting a first sensing current which is generated by the test signal and corresponds to the first pixel and a second sensing current which is generated by the test signal and corresponds to the second pixel; and detecting a pixel current of a pixel corresponding to a scan line from among the plurality of scan lines to which the scan signal is supplied, by using the first sensing current and the second sensing current.

The detecting of the pixel current may include detecting the pixel current by comparing the first sensing current and the second sensing current.

The applying of the test signal may include applying a voltage to a plurality of input terminals of an amplifier; supplying an output voltage generated from the amplifier according to a difference between voltages input to the plurality of input terminals to a gate of a plurality of transistors; and applying the test signal to the data line by using a voltage source coupled to one end of at least one of the plurality of transistors, according to the output voltage supplied to the gate.

The plurality of transistors may include a first transistor of which one end is coupled to a voltage source and another end is coupled with the data line and an input terminal of the amplifier through a first node; and a second transistor of which one end is coupled to the sensing capacitor in which a sensing voltage is generated according to the sensing current and the other end is coupled with the first node.

The detecting of the pixel current may include applying a first sensing voltage generated according to the first sensing current of the sensing capacitor corresponding to the first data line and a second sensing voltage generated according to the second sensing current of the sensing capacitor corresponding to the second data line to a comparator; and detecting the pixel current by using a voltage value output by the comparator.

The driving method may further include compensating for a data signal applied to the pixel as a compensation value corresponding to a detected pixel current value.

Further aspects of the display device according to embodiments of the present invention will be described as follows.

According to at least one of the example embodiments, it is possible to accurately (e.g., exactly) measure the pixel current flowing in the driving transistor.

Further, according to at least one of the example embodiments, since a feedback line for measuring a pixel current is not separately provided, it is possible to decrease the size (e.g., miniaturize) a display panel circuit.

Further, the above aspects desired to be achieved in the present invention are not limited to the aforementioned aspects, and other aspects not described above will be apparent to those skilled in the art from the disclosure.

DETAILED DESCRIPTION

Figure 1:
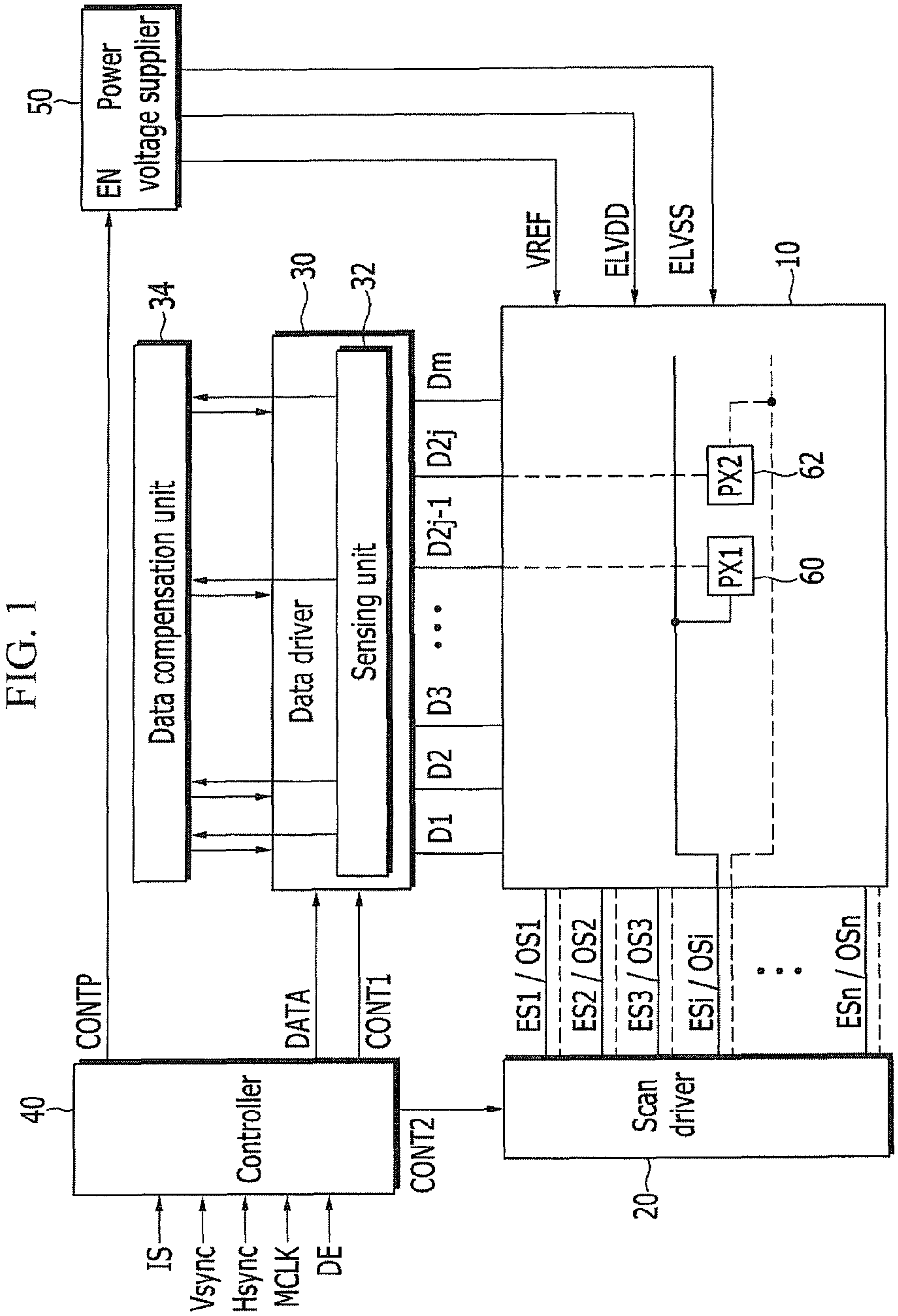
FIG. 1 is a block diagram illustrating a schematic configuration of a display device according to an example embodiment of the present invention.

Embodiments of the present invention will be described more fully hereinafter with reference to the accompanying drawings, in which example embodiments of the present invention are shown. As those skilled in the art would realize, the described embodiments may be modified in various different ways, all without departing from the spirit or scope of the present invention.

In order to elucidate embodiments of the present invention, parts that are not related to the description may be omitted. Like reference numerals designate like elements throughout the specification.

Throughout this specification and the claims that follow, when it is described that an element is “coupled” to another element, the element may be “directly coupled” to the other element or “electrically coupled” to the other element through a third element. In addition, unless explicitly described to the contrary, the word “comprise” and variations such as “comprises” or “comprising”, will be understood to imply the inclusion of stated elements but not the exclusion of any other elements.

FIG. 1 is a block diagram illustrating a schematic configuration of a display device according to an example embodiment of the present invention.

Referring to FIG. 1, the display device includes a display unit 10 including a plurality of pixels, a scan driver 20, a data driver 30, a controller 40, a power voltage supplier 50, a sensing unit (or sensor) 32, and a data compensating unit (or data compensator or data compensation unit) 34.

The display unit 10 is a display panel including pixels 60 and 62, which are coupled (e.g., connected) to corresponding scan lines among a plurality of scan lines ES1/OS1 to ESn/OSn and corresponding data lines among a plurality of data lines D1 to Dm. Each of the plurality of pixels corresponds to an image data signal transferred to the corresponding pixel to display an image.

Each of the plurality of pixels included in the display unit 10 is coupled (e.g., connected) to a corresponding one of the plurality of scan lines ES1/OS1 to ESn/OSn and to a corresponding one of the plurality of data lines D1 to Dm to be arranged in a substantially matrix form. A plurality of first scan lines ES1 to ESn and a plurality of second scan lines OS1 to OSn are extended substantially in a row direction to be substantially parallel to each other. The plurality of data lines D1 to Dm are extended substantially in a column direction to be substantially parallel to each other. Each of the plurality of pixels of the display unit 10 receives a power voltage from the power voltage supplier 50 to receive a first driving voltage ELVDD and a second driving voltage ELVSS.

In this case, first pixels 60 among pixels arranged in an i-th row of the display unit 10 may be coupled to corresponding first data lines D1, D3, . . . , D2*j*−1, and second pixels 62 from among pixels arranged in the i-th row may be coupled to corresponding second data lines D2, D4, and D2*j*.

The scan driver 20 is coupled to the display unit 10 through the plurality of scan lines ES1/OS1 to ESn/OSn. The scan driver 20 generates a plurality of scan signals capable of activating each pixel of the display unit 10 according to a scan control signal CONT2 to transfer the generated scan signal to a corresponding scan line among the plurality of scan lines ES1/OS1 to ESn/OSn.

In this case, the plurality of first scan lines ES1 to ESn may be coupled to the first pixels 60, and the plurality of second scan lines OS1 to OSn may be coupled to the second pixels 62.

The scan control signal CONT2 is an operation control signal of the scan driver 20 which is generated in and transferred from the controller 40. The scan control signal CONT2 may include a scan start signal, a clock signal, and the like. The scan start signal is a signal generating a first scan signal for displaying an image for one frame. The clock signal is a synchronization signal for sequentially applying scan signals to the plurality of scan lines ES1/OS1 to ESn/OSn.

The data driver 30 is coupled to each pixel of the display unit 10 through the plurality of data lines D1 to Dm. The data driver 30 receives an image data signal DATA to transfer the received image data signal DATA to a corresponding data line among the plurality of data lines D1 to Dm according to a data control signal CONT1.

The data control signal CONT1 is an operation control signal of the data driver 30 which is generated in and transferred from the controller 40.

The data driver 30 selects a gray voltage according to the image data signal DATA to transfer the selected gray voltage to the plurality of data lines D1 to Dm as a data signal.

The controller 40 receives image information IS input from the outside and an input control signal controlling a display of the image information. The image information IS stores luminance information of each pixel PX of the display unit 10, and luminance may be classified into a number of grays (e.g., a predetermined number of grays), for example, 1024, 256, or 64 grays.

An example of the input control signal transferred to the controller 40 includes a vertical synchronization signal Vsync, a horizontal synchronization signal Hsync, a main clock MCLK, a data enable signal DE, and the like.

The controller 40 properly image-processes the input image information IS based on the input image information IS and the input control signal according to an operation condition of the display unit 10 and the data driver 30. In detail, the controller 40 performs image processing such as gamma correction and luminance compensation with respect to the image information IS to generate the image data signal DATA.

Further, the controller 40 transfers a scan control signal CONT2 for controlling an operation of the scan driver 20 to the scan driver 20. The controller 40 generates the data control signal CONT1 for controlling an operation of the data driver 30 and transfers the data control signal CONT1 to the data driver 30 together with the image data signal DATA through the image processing.

Next, the controller 40 may control driving of the power voltage supplier 50. The power voltage supplier 50 supplies a power voltage for driving each pixel of the display unit 10.

For example, the controller 40 is coupled to the power voltage supplier 50 and a driving terminal EN to transfer a driving signal CONTP to the power voltage supplier 50 and to drive the power voltage supplier 50.

Further, the controller 40 controls a switching operation of a first switching element and a second switching element included in the sensing unit 32 to control a process of extracting an operation voltage of the driving transistor of the pixels or degradation information of the organic light emitting diode by the sensing unit 32.

Further, the controller 40 controls an input process of a test voltage and an output process of a sensing current, and may control the data driver 30 to transfer the image data signal to the data lines D1 to Dm according to an image signal.

Next, the power voltage supplier 50 is electrically coupled to each pixel through a power wire, which supplies the power voltage to each pixel of the display unit 10. The power voltage may be a first power voltage ELVDD and a second power voltage ELVSS, which have high levels.

Next, the sensing unit 32 is coupled to the data lines D1 to Dm to detect a pixel current of each pixel of the plurality of pixels for calculating an optimal driving voltage or a voltage corresponding to the pixel current.

In this case, the sensing unit 32 may detect the pixel current of each pixel of the plurality of pixels or the voltage corresponding to the pixel current by sensing current values detected by applying the same test signal to the plurality of pixels which are adjacently arranged or voltage values corresponding to the sensing current values. Hereinafter, a current flowing in the data line as the test signal applied is assumed as the sensing current.

For example, the sensing unit 32 may detect a pixel current of the first pixel 60 or a pixel current of the second pixel 62 from a difference value between a sensing current flowing in the first data line D2*j*−1 and a sensing current flowing in the second data line D2*j* adjacent to the first data line D2*j*−1, when the scan signal is selectively applied through the first scan line ESi and the second scan line OSi coupled to the pixels arranged in the same row and the test signal is applied to the data line.

Here, a timing of extracting the operation voltage of the driving transistor and the degradation information of the organic light emitting diode of the pixels 60 and 62 are not particularly limited, but the extracting may be performed whenever the power is applied to the organic light emitting diode display or before a display device is initially released as a product. Further, the sensing unit 32 may periodically and automatically operate, but may be set to randomly operate by a user's setting.

In the example embodiment of FIG. 1, the sensing current of the first pixel 60 is measured by using the data lines D1 to Dm, but it is just an example embodiment, and of course, the test voltage is supplied to the data line, and a sensing current output line coupled to the first pixel 60 which is independently separated is further provided to measure the sensing current of the first pixel 60.

In the example embodiment of separating the sensing current output line and the test voltage input line, a plurality of sensing current output lines coupling the sensing unit 32 and each of the plurality of pixels which is separated from the data lines D1 to Dm may be added.

Next, the data compensating unit 34 may compensate for data by using the measured pixel current of each pixel. In other words, the data compensating unit 34 detects a compensation value for compensating for the operation voltage of the driving transistor according to the pixel current of each pixel and the mobility deviation to store the compensation value in a memory. In addition, the data compensating unit 34 may compensate for input data by using the stored compensation value.

For example, the data compensating unit 34 detects the operating voltage representing a characteristic of the driving transistor and the mobility deviation (a ratio in mobility between the corresponding pixel and a reference pixel) between pixels from the test voltage and the measured sensing current of each pixel by using a function of calculating the pixel current according to the operation voltage of the driving transistor and the mobility, and detects an offset value for compensating for the detected operation voltage and a gain value for compensating for the mobility deviation as the compensation value to store the detected values in the memory in a look-up table form.

The data compensating unit 34 may compensate for the data signal by using the stored offset value and gain value of each pixel. For example, the controller 40 compensates for the data signal by multiplying the gain value by the data signal and adding the offset value to the data signal.

In the example embodiment of FIG. 1, the data compensating unit 34 is configured as a separate element, but is not necessarily limited thereto, and may be included in the controller 40 or the sensing unit 32.

The controller 40 may control the data compensating unit 34 to compensate for the data signal according to a driving method of the display device according to the example embodiment. However, this is just an example embodiment, and the controller 40 may be configured to perform a function of the data compensating unit 34.

Figure 2:
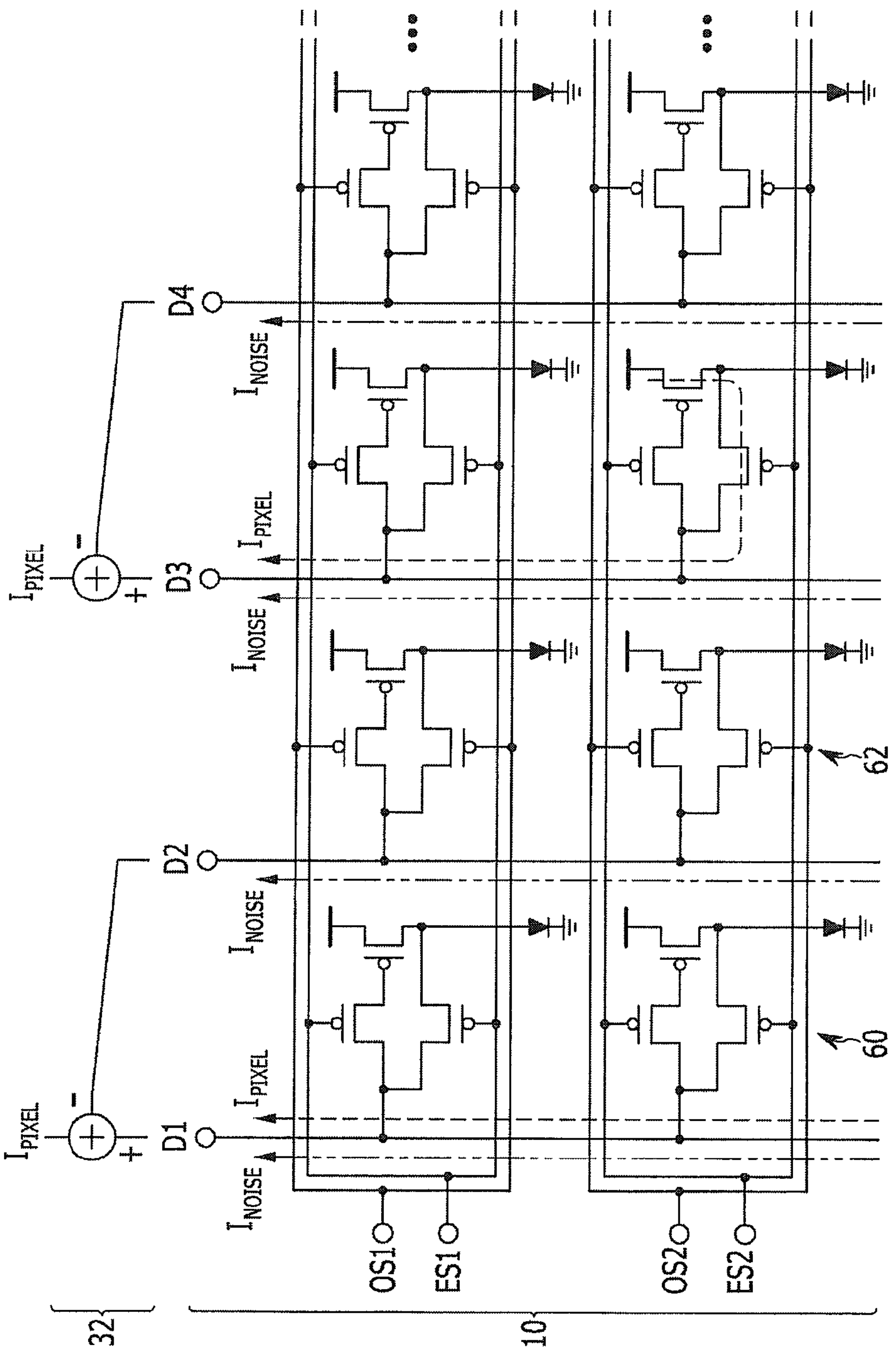
FIGS. 2 and 3 are circuit diagrams schematically illustrating an example of a structure of a display unit and a sensing unit of the display device according to the example embodiment shown in FIG. 1.
Figure 3:
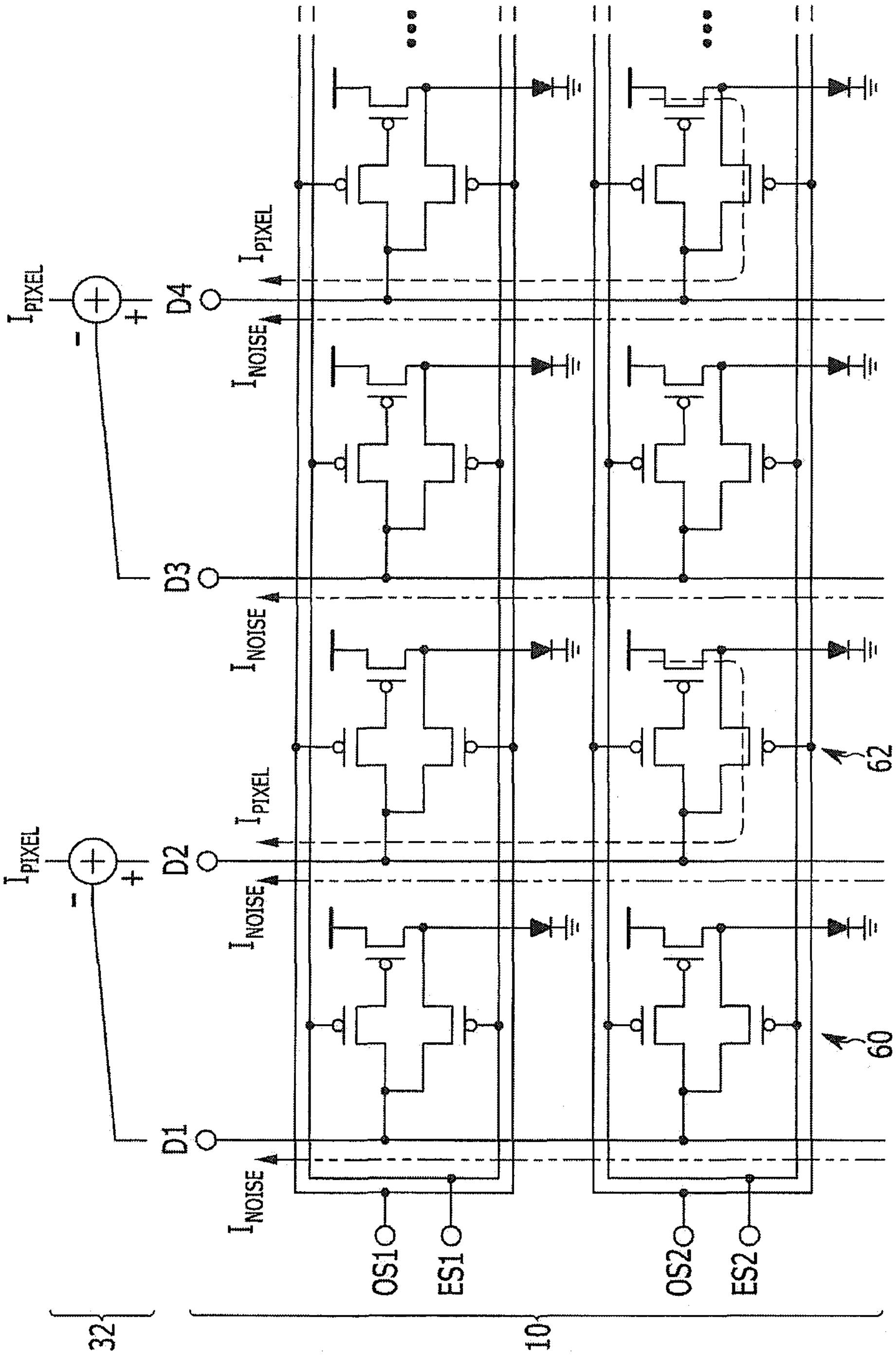

FIGS. 2 and 3 are circuit diagrams schematically illustrating an example of a structure of the display unit 10 and the sensing unit 32 of the display device according to the example embodiment shown in FIG. 1.

Referring to FIG. 2, the first pixels among pixels arranged in a first row are coupled to the first scan line ES1 in the first row, and the second pixels among the pixels arranged in the first row may be coupled to the second scan line OS1 in the first row.

Similarly, the first pixels among pixels arranged in a second row are coupled to the first scan line ES2 in the second row, and the second pixels among the pixels arranged in the second row may be coupled to the second scan line OS2 in the second row.

The sensing unit 32 may detect the pixel current by comparing the sensing currents detected from the first data line D2*j*−1 and the second data line D2*j* which are adjacent to each other.

For example, in order to detect the pixel current of each of the first pixels 60 among the pixels arranged in the second row, the scan driver 20 may apply the scan signal to only the first scan line ES2 in the second row.

The sensing unit 32 applies a test signal to the plurality of data lines D1 to D4. Then, the test signal is supplied according to a scan signal applied to the first pixels 60 and thus a pixel current $I_{PIXEL}$ of the first pixels 60 flows to the corresponding first data lines D1 and D3.

In this case, a noise current $I_{NOISE}$ due to a parasitic component and the like flows in the first data line D1 and the second data line D2. That is, the sensing current flowing to the first data line D1 includes the pixel current $I_{PIXEL}$ and the noise current $I_{NOISE}$, and the sensing current flowing to the second data line D2*j* includes the noise current $I_{NOISE}$.

The sensing unit 32 detects the pixel current $I_{PIXEL}$ of the first pixel 60 by comparing the sensing current of the first data line D1 and the sensing current of the second data line D2 arranged to be adjacent to the first data line D1 to remove the noise current $I_{NOISE}$ component of the first data line D1 from the noise current $I_{NOISE}$ of the second data line D2.

Next, referring to FIG. 3, in order to detect the pixel current $I_{PIXEL}$ of each of the second pixels 62 among the pixels arranged in the second row, the scan driver 20 may apply the scan signal to only the second scan line OS2 in the second row. The sensing unit 32 applies the test signal to the plurality of data lines. Then, the test signal is supplied according to a scan signal applied to the second pixels 62 and thus a pixel current $I_{PIXEL}$ of the second pixels 62 flows to the corresponding second data line D2.

In this case, a noise current $I_{NOISE}$ due to a parasitic component and the like flows in the first data line D1 and the second data line D2. That is, the sensing current flowing to the second data line D2*j* includes the pixel current $I_{PIXEL}$ and the noise current $I_{NOISE}$, and the sensing current flowing to the first data line D1 includes the noise current $I_{NOISE}$.

The sensing unit 32 detects the pixel current $I_{PIXEL}$ of the second pixel 62 by comparing the sensing current of the second data line D2 and the sensing current of the first data line D1 arranged to be adjacent to the second data line D2*j* to remove the noise current $I_{NOISE}$ component of the second data line D2 from the noise current $I_{NOISE}$ of the first data line D1.

In FIGS. 2 and 3, the sensing unit 32 detects the pixel current $I_{PIXEL}$ by comparing the sensing currents, but the sensing unit 32 may detect the pixel current $I_{PIXEL}$ by using the voltage corresponding to the sensing current. This will be described below with reference to FIGS. 4 and 5.

Figure 4:
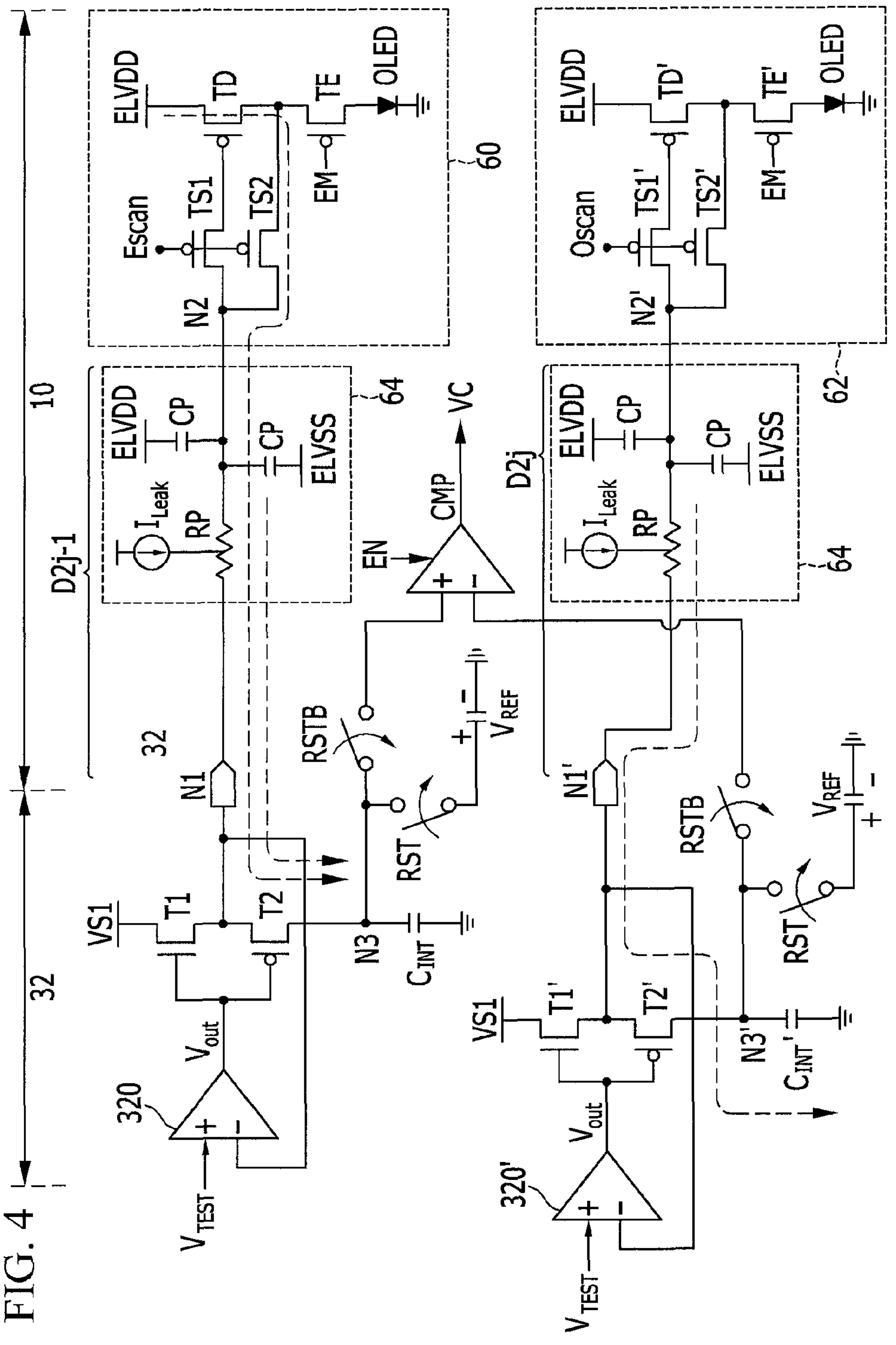
FIG. 4 is a detailed circuit diagram illustrating an example of a structure of a display unit and a sensing unit for detecting a pixel current of a first pixel coupled to a first data line of a display device according to another example embodiment of the present invention.

FIG. 4 is a detailed circuit diagram illustrating an example of a structure of the display unit 10 and the sensing unit 32 for detecting the pixel current $I_{PIXEL}$ of the first pixel 60 coupled to the first data line D2*j*−1 of the display device according to the example embodiment.

As illustrated in FIG. 4, the sensing unit 32 may be coupled to the first data line D2*j*−1 and the second data line D2*j*. The sensing unit 32 may include an amplifier and an output terminal for supplying a test signal, a sensing capacitor $C_{INT}$ for detecting the sensing current flowing to the data line, and a comparator CMP for comparing voltage values detected by a sensing capacitor $C_{INT}$ corresponding to the first data line D2*j*−1 and the second data line D2*j*.

In this case, the controller 40 may apply a scan signal to only a first scan line ESi coupled to the first pixel 60 in order to detect the pixel current $I_{PIXEL}$ of the first pixel 60, and may not apply the scan signal to a second scan line OSi coupled to the second pixel 62. In addition, the same test voltage $V_{TEST}$ may be applied to the first data line D2*j*−1 and the second data line D2*j*.

Hereinafter, the amplifier 320 coupled to the first data line D2*j*−1, the output terminal, the sensing capacitor $C_{INT}$, and the first pixel 60 will be described.

First, the test voltage $V_{TEST}$ is applied to a non-inversion terminal (+) of the amplifier 320, and a voltage output from the output terminal may be applied to an inversion terminal (−). The amplifier 320 generates an output voltage Vout according to a voltage difference between the non-inversion terminal (+) and the inversion terminal (−).

The output terminal includes a first transistor T1 and a second transistor T2. When the first transistor T1 of the output terminal is turned on, a current is supplied from a voltage source VS1. When the second transistor T2 of the output terminal is turned on, a current is sunk to the ground.

The voltage output from the output terminal is increased by the supplied current or decreased by a sink current. When the output voltage of the output terminal is increased, an output voltage Vout of the amplifier 320 is reduced. In addition, when the output voltage of the output terminal is decreased, the output voltage Vout of the amplifier 320 is increased.

When the output voltage Vout of the amplifier 320 is decreased, the sink current increases, and the voltage output from the output terminal is decreased. In addition, when the output voltage Vout of the amplifier 320 is increased, the supplied current decreases, and the voltage output from the output terminal is increased.

The output voltage of the output terminal is controlled by the supply of the test voltage $V_{TEST}$ as described above, and the output voltage of the output terminal becomes substantially the same voltage as the test voltage $V_{TEST}$. Then, the voltage of the inversion terminal (−) of the amplifier 320 is maintained as the test voltage $V_{TEST}$.

One end of the first transistor T1 may be coupled to one end of the first data line D2*j*−1 and the second transistor T2 through the first node N1. In addition, a voltage source VS1 may be coupled to the other end of the first transistor T1. The first transistor T1 may be an n-channel type transistor.

The other end of the second transistor T2 may be coupled to the sensing capacitor $C_{INT}$ and a third node N3. The second transistor T2 may be a p-channel type transistor.

In addition, the sensing capacitor $C_{NT}$ may be coupled to a first switching element RST and the other end of the second transistor T2.

When the current is supplied to the sensing capacitor $C_{HIT}$ from the other end of the second transistor T2, a voltage is generated at the third node N3.

For example, when the first switching element RST is turned off, the current flowing from the second transistor T2 charges the sensing capacitor $C_{INT}$. Then, the voltage of the third node N3 may be applied to the comparator CMP according to an operation of the second switch.

The first switching element RST may be turned on or off according to a control of the controller 40.

In addition, the first node N1 may be coupled with a 2j−1-th data line D2*j*−1. When the scan signal Escan is applied to the first scan line ESi coupled with the first pixel 60 for measuring the sensing current, the plurality of first pixels 60 coupled to the first node N1 and the data line D2*j*−1 to which the first pixel 60 is coupled may operate like a parasitic element. A parasitic element 64 may include a parasitic resistor RP and a parasitic capacitor CP.

The first pixel 60 includes an organic light emitting diode OLED as an organic light emitting element, and a pixel driving circuit for controlling the organic light emitting diode OLED. The pixel driving circuit includes a driving transistor TD, a first switching transistor TS1, and a second switching transistor TS2. In addition, the pixel driving circuit may further include an emission transistor TE.

FIG. 4 representatively illustrates the structure of the first pixel 60 which is configured with four transistors, but the pixel circuit structure of the display device is not limited to the structure and may be variously configured.

In the first pixel 60 of FIG. 4, the first switching transistor TS1 includes a gate electrode coupled to the first scan line ESi, a source electrode coupled to the first data line D2*j*−1, and a drain electrode coupled to the gate electrode of the driving transistor TD.

In addition, the second switching transistor TS2 includes a gate electrode coupled to the first scan line ESi, a source electrode coupled to the 2j−1-th data line D2*j*−1, and a drain electrode coupled to the drain electrode of the driving transistor TD.

In this case, the source electrode of the first switching transistor TS1 and the source electrode of the second switching transistor TS2 are coupled to the first data line D2*j*−1 and a second node N2.

The driving transistor TD includes a gate electrode coupled to the drain electrode of the first switching transistor TS1, a source electrode for receiving the first power voltage ELVDD, and a drain electrode coupled to an anode of the organic light emitting diode OLED through the emission transistor TE.

The first power voltage ELVDD is supplied to the source electrode of the driving transistor TD through the power wire coupled to the power voltage supplier 50 as illustrated in FIG. 1.

The OLED may emit light of the first pixel 60 according to the data signal when the drain electrode of the emission transistor TE is coupled to the driving transistor TD, the source electrode of the emission transistor TE is coupled to the OLED, and the emission signal EM is applied to the gate of the emission transistor TE. Hereinafter, it is assumed that for a period of detecting the sensing current, the supply of the emission signal EM stops, and as a result, the emission transistor TE included in the first pixel 60 does not operate.

The organic light emitting diode OLED includes an anode coupled to the drain electrode of the emission transistor TE, and a cathode coupled to a ground (e.g., the ground may be the same as the second power voltage ELVSS). The ground voltage (e.g., the second power voltage ELVSS) is supplied to the cathode of the organic light emitting diode OLED through the power wire coupled to the power voltage supplier 50 as illustrated in FIG. 1.

The driving transistor TD, the first switching transistor TS1, the second switching transistor TS2, and the emission transistor TE which are configured in the first pixel 60 of FIG. 4 may be p-channel type transistors. Accordingly, a gate-on voltage for turning on the driving transistor TD, the first switching transistor TS1, the second switching transistor TS2, and the emission transistor TE is a low level voltage, and a gate-off voltage turning off the driving transistor TD, the first switching transistor TS1, the second switching transistor TS2, and the emission transistor TE is a high level voltage.

The first pixel 60 illustrated in FIG. 4 includes the p-channel type thin film transistors, but example embodiments of the present invention are not limited thereto. At least one of the driving transistor TD, the first switching transistor TS1, the second switching transistor TS2, and/or the emission transistor TE may be an n-channel type transistor.

In addition, since the amplifier 320', the output terminal, the sensing capacitor $C_{INT}$, and the second pixel 62, which are coupled to the second data line D2*j* are the same as or substantially similar to the amplifier 320, the output terminal, the sensing capacitor $C_{INT}$, and the first pixel 60 which are coupled to the first data line D2*j*−1, the description thereof is omitted.

Next, the comparator CMP may be coupled to third nodes N3 and N3' through a second switching element RSTB. For example, the non-inversion terminal of the comparator CMP may be coupled to one end of the second switch corresponding to the first data line D2j−1, and the other end of the second switch may be coupled to the third node N3. In addition, the inversion terminal of the comparator CMP may be coupled to one end of the second switch corresponding to the second data line D2j, and the other end of the second switch may be coupled to the third node N3'.

The comparator CMP may output values comparing the third node voltages applied to the inversion terminal and the non-inversion terminal, when the respective second switches are turned on.

For example, the third node voltage may be represented by the following Equations 1 and 2.

$$VCapE = V_{REF} + \frac{(I_{PIXEL} + I_{NOISE}) \cdot t}{C_{INT}} \quad \text{Equation 1}$$

$$VCapO = V_{REF} + \frac{I_{NOISE} \cdot t}{C_{INT}} \quad \text{Equation 2}$$

In this case, VCapE may be a voltage value input to the non-inversion terminal, VCapO may be a voltage value input to the inversion terminal, $V_{REF}$ may be a reference voltage, $I_{PIXEL}$ may be a pixel current $I_{PIXEL}$, $I_{NOISE}$ may be a noise current $I_{NOISE}$, $C_{INT}$ may be a capacitance of the sensing capacitor $C_{INT}$, and t may be a time (e.g., a predetermined time).

Then, the voltage output by the comparator CMP may be represented by the following Equation 3.

$$VCapE - VCapO = \frac{I_{PIXEL} \cdot t}{C_{INT}} \quad \text{Equation 3}$$

Accordingly, the pixel current $I_{PIXEL}$ of the first pixel 60 may be accurately (e.g., exactly) detected by using the voltage value output from the comparator CMP and the above Equation 3.

Figure 5:
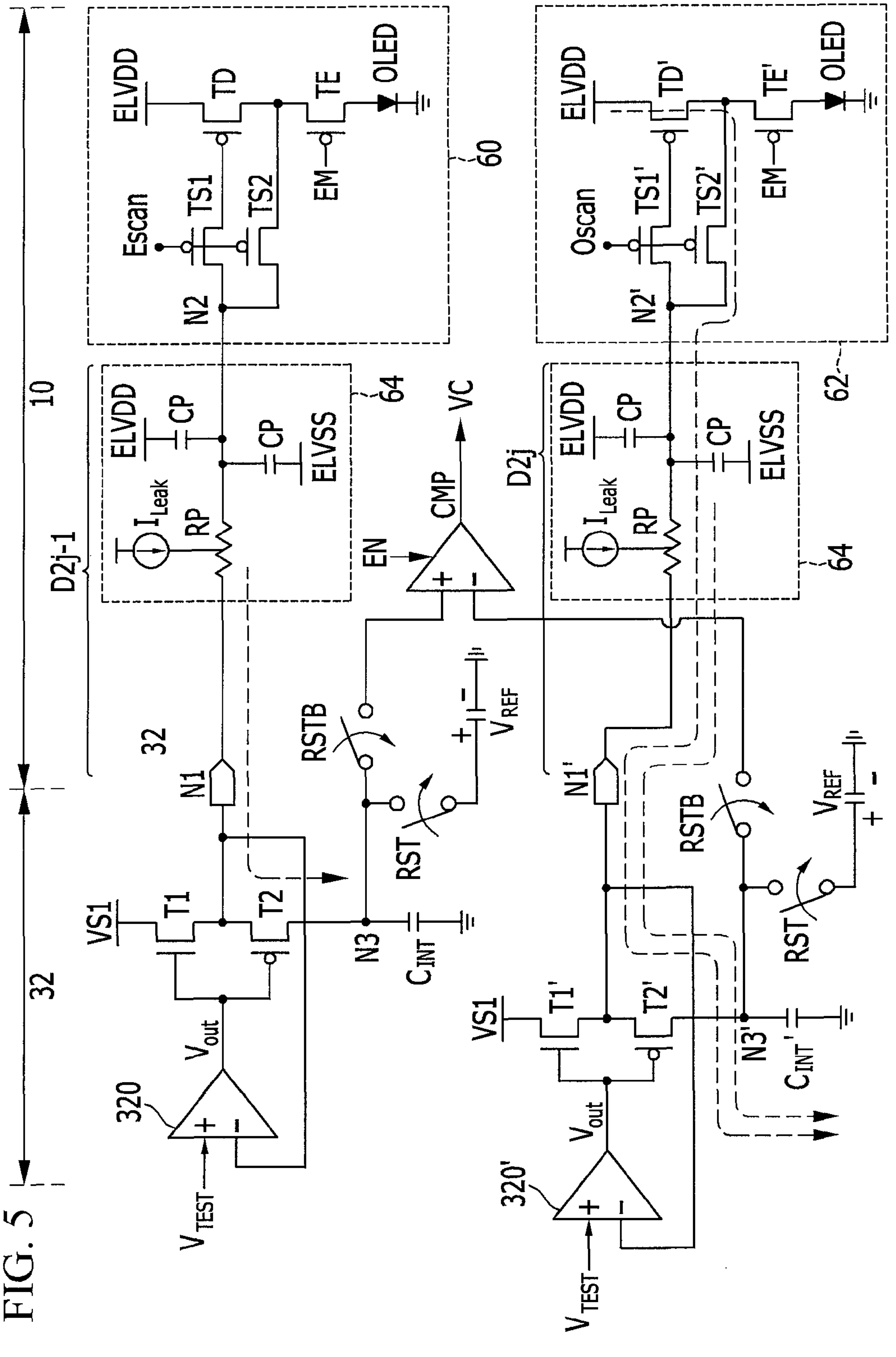
FIG. 5 is a detailed circuit diagram illustrating an example of a structure of a display unit and a sensing unit of detecting a pixel current of a second pixel coupled to a second data line of a display device according to another example embodiment of the present invention.

Next, FIG. 5 is a detailed circuit diagram illustrating an example of a structure of the display unit 10 and the sensing unit 32 detecting the pixel current $I_{PIXEL}$ of the second pixel 62 coupled to the second data line D2j of the display device according to the example embodiment.

In order to detect the pixel current $I_{PIXEL}$, of the second pixel 62, the controller 40 may apply a scan signal Oscan to only the second scan line OSi coupled to the second pixel 62 and may not apply the scan signal Escan to the first scan line ESi coupled to the first pixel 60.

In addition, the sensing unit 32 may detect the pixel current $I_{PIXEL}$ of the second pixel 62 by comparing voltages input to both terminals of the comparator CMP generated by applying the test voltage $V_{TEST}$ to the first data line D2j−1 and the second data line D2j.

Hereinafter, a method of detecting the pixel current $I_{PIXEL}$ according to an example embodiment will be described with reference to a timing diagram of FIG. 6.

Figure 6:
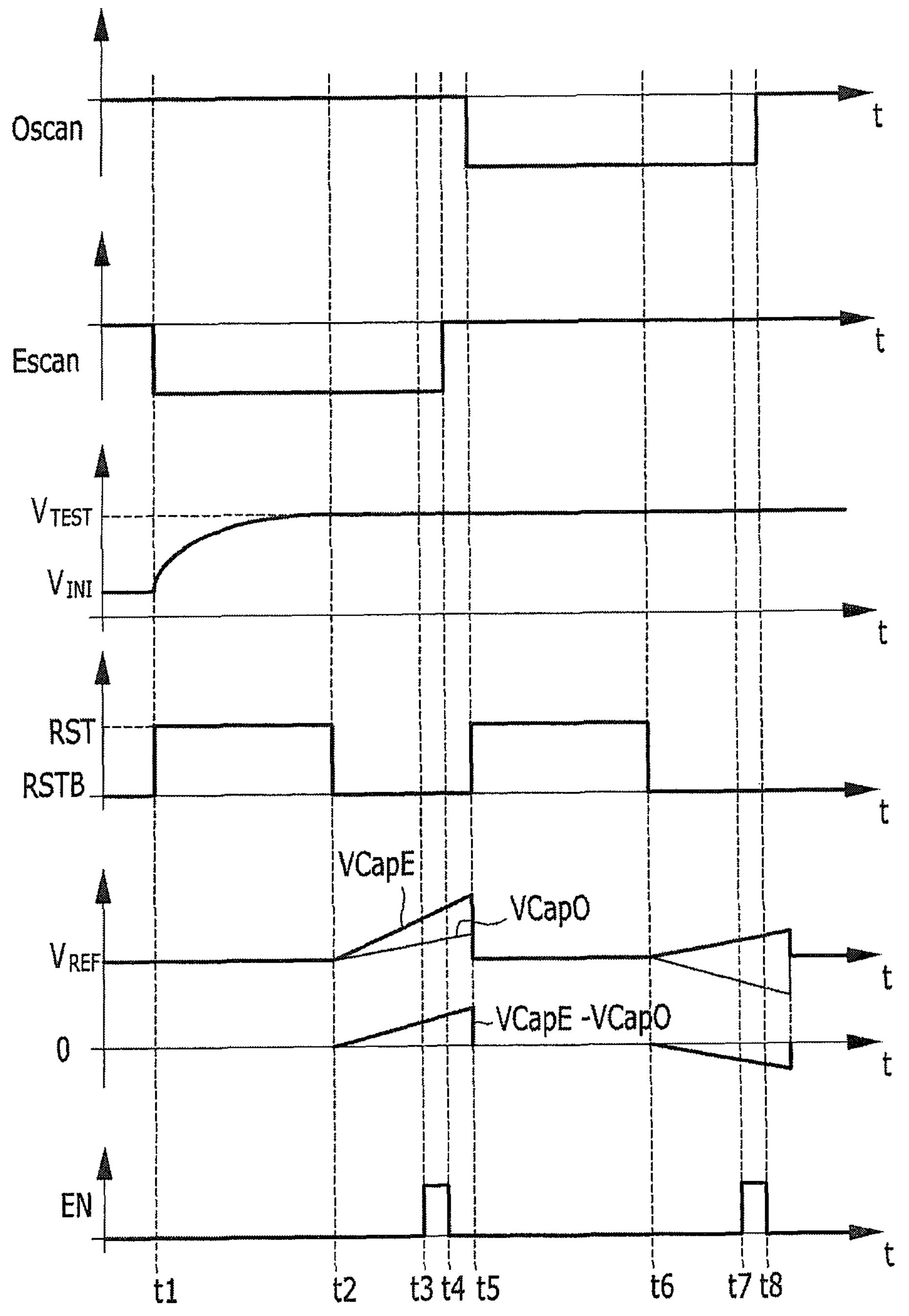
FIG. 6 is a timing diagram of pixel current measurements of the display device according to another example embodiment of the present invention.

FIG. 6 is a timing diagram of pixel current $I_{PIXEL}$ measurement of the display device according to the example embodiment.

First, before a time t1, an initial voltage (e.g., a predetermined initial voltage) $V_{INI}$ may be applied to the second node N2.

Next, at the time t1, the test voltage $V_{TEST}$ is applied to the non-inversion terminal (+) of each of the of the amplifiers 320 and 320' coupled to the first data line D2j−1 and the second data line D2j, and the scan signal corresponding to the gate-on voltage is transferred to the first scan line ESi.

The first switching transistor TS1 and the second switching transistor TS2 coupled to the first scan line ESi are turned on according to the transferred scan signal. Then, the driving transistor TD of which one end is coupled to the first power voltage ELVDD, and the other end is coupled to the drain electrode of the second switching transistor TS2 may operate like a diode.

A first switching transistor TS1' and a second switching transistor TS2' coupled to the second scan line OSi are turned off, and the noise current $I_{NOISE}$ flows to the second data line D2j.

In addition, at the time t1, when the first switching element RST is turned on, the current flowing to the first data line D2j−1 and the second data line D2j is sunk to the ground.

After the time t1, the voltage of the second node N2 is increased. When the voltage of the second node N2 is increased, the voltage applied to the gate of the driving transistor TD is increased. In addition, the current flowing in the driving transistor TD is decreased.

At a time t2 when the voltage of the second node N2 is the same as the test voltage $V_{TEST}$, the first switching element RST is turned off by the controller 40, and the second switching element RSTB is turned on. Accordingly, the sensing current flowing in the driving transistor TD flows to the sensing capacitors $C_{INT}$ and $C_{INT'}$ through the transistor T2.

Then, the sensing capacitors $C_{INT}$ and $C_{INT'}$ generate voltages with time like the above Equation 1 and Equation 2.

At a time t3, a signal EN for turning on the comparator CMP is applied to the comparator CMP. The comparator CMP may output a result value VC obtained by comparing voltages applied to the non-inversion terminal and the inversion terminal like the above Equation 3.

In addition, at a time t4, the supply of the scan signal stops in the first scan line.

Next, at a time t5, a scan signal corresponding to the gate-on voltage is transferred to the second scan line OSi. In addition, the first switching element RST is turned on and the second switching element RSTB is turned off, and as a result, the current flowing to the first data line D2j−1 and the second data line D2j is sunk to the ground.

At a time t6 when the voltage of the second node N2' is the same as the test voltage $V_{TEST}$, the first switching element RST is turned off by the controller 40, and the second switching element RSTB is turned on. Then, the sensing current flowing in the driving transistor TD flows to the sensing capacitors $C_{INT}$ and $C_{INT'}$ through the transistor T2'.

Then, the sensing capacitors $C_{INT}$ and $C_{INT'}$ generate voltages with time like the above Equation 1 and Equation 2.

At a time t7, a signal EN turning on the comparator CMP is applied to the comparator CMP. The comparator CMP may output a result value VC obtained by comparing voltages applied to the non-inversion terminal and the inversion terminal like the above Equation 3.

In addition, at a time t8, the supply of the scan signal to the second scan line D2j stops.

The pixel current $I_{PIXEL}$ of the first pixel 60 may be detected by using the sensing current $I_{PIXEL}+I_{NOISE}$ of the first data line D2j−1 and the noise current $I_{NOISE}$ of the second data line D2j which are detected by supplying the first scan signal to only the first pixel 60, while applying the test signal to the first data line D2*j*−1 coupled to the first pixel 60 and the second data line D2*j* coupled to the second pixel 62 adjacent to the first pixel 60.

Since the first data line D2*j*−1 and the second data line D2*j*, the first pixels 60 coupled to the first data line D2*j*−1, and the second pixels 62 coupled to the second data line D2*j* are positioned in adjacent spaces to have similar electric characteristics, the noise current $I_{NOISE}$ detected from the first data line D2*j*−1 and the noise current $I_{NOISE}$ detected from the second data line D2*j* may have similar values.

In the display device according to the example embodiment, since the sensing current flowing in the first data line D2*j*−1 and the noise current $I_{NOISE}$ flowing in the second data line D2*j* are detected together when the pixel current $I_{PIXEL}$ of the first pixel 60 coupled to the first data line D2*j*−1 is detected, and the noise current $I_{NOISE}$ value is subtracted from the sensing current value, the pixel current $I_{PIXEL}$ of the first pixel 60 may be accurately (e.g., exactly) measured.

The sensing unit 32 and the pixel structure are not limited to the configuration illustrated in FIGS. 2 to 5, and each configuration may be easily replaced by those skilled in the art.

The drawings referred in the above and disclosed description only illustrate embodiments of the present invention, and are intended to describe embodiments of the present invention and not to restrict the meanings or the scope claimed in the claims, and equivalents thereof. Therefore, those skilled in the art can easily select and substitute the drawings and disclosed description.

Further, those skilled in the art may omit some of the constituent elements described in the present specification without deterioration in performance thereof or may add constituent elements to improve performance thereof. Furthermore, those skilled in the art may modify the sequence of the steps of the method described in the present specification depending on the process environment or equipment. Therefore, the scope of embodiments of the present invention may be determined by the scope of the claims and equivalents thereof, and not by the described embodiments.

DESCRIPTION OF SYMBOLS

10: Display unit
20: Scan driver
30: Data driver
32: Sensing unit
34: Data compensating unit
40: Controller
50: Power voltage supplier
60: First pixel
62: Second pixel

What is claimed is:

1. A display device comprising:

a plurality of pixels arranged in a plurality of rows and a plurality of columns, each of the plurality of pixels being coupled to a corresponding data line among a plurality of data lines and a corresponding scan line among a plurality of scan lines;

a scan driver to supply a scan signal to the plurality of scan lines;

a data driver to supply a data voltage to the plurality of data lines;

a sensing unit coupled to the plurality of pixels and the plurality of data lines and configured to detect a sensing current according to a test signal input to the plurality of data lines; and a controller configured to control the sensing unit to:

detect a pixel current of a first pixel from among the plurality of pixels, the first pixel corresponding to a first scan line from among the plurality of scan lines to which the scan signal is supplied and connected to a first data line from among the plurality of data lines, by detecting, by the-sensing unit, a first sensing current corresponding to the first pixel from among the plurality of pixels and a second sensing current corresponding to a second pixel from among the plurality of pixels, the second pixel corresponding to a second scan line from among the plurality of scan lines and connected to a second data line from among the plurality of data lines, the second data line being adjacent to the first data line, when the test signal is concurrently applied to the first data line and the second data line, and the scan signal is selectively supplied to only the first scan line from among the plurality of scan lines, the first pixel and the second pixel being in a same row of the plurality of rows, and by generating, by the sensing unit, a first sensing voltage corresponding to the first sensing current and a second sensing voltage corresponding to the second sensing current, and output a pixel voltage corresponding to the pixel current, wherein the sensing unit comprises:

a first sensing capacitor to generate the first sensing voltage according to the first sensing current, a second sensing capacitor configured to generate the second sensing voltage according to the second sensing current, and a comparator to output a voltage difference between the first sensing voltage and the second sensing voltage as the pixel voltage.

2. The display device of claim 1, wherein:

the pixel current is detected by comparing the first sensing current and the second sensing current.

3. The display device of claim 1, further comprising:

a data driver to supply a data signal to the plurality of data lines, wherein the scan driver is configured to supply the scan signal to the first scan line and the second scan line so that the data signal is concurrently supplied to the first pixel and the second pixel.

4. The display device of claim 3, further comprising:

a power voltage supplier to supply a power voltage to the pixel; and a driving transistor driven according to the data signal and the power voltage so that the pixel emits light.

5. The display device of claim 1, wherein:

the sensing unit further comprises:

an amplifier to generate an output voltage according to a difference between voltages input to a plurality of input terminals;

an output terminal coupled to the amplifier and configured to supply the test signal to the data line by using a plurality of transistors driven according to the output voltage;

a first switching element coupled to the output terminal and driven so that the first sensing current is applied to the first sensing capacitor; and a second switching element coupled to the comparator and driven so that the first sensing voltage and the second sensing voltage are applied to the comparator.

6. The display device of claim 5, wherein:

the plurality of transistors comprises:

a first transistor of which one end is coupled to a voltage source and another end is coupled to the data line and an input terminal of the amplifier through a first node; and a second transistor of which one end is coupled to the sensing capacitor and another end is coupled to the first node.

7. The display device of claim 6, wherein:

the first transistor is to operate by the output voltage to supply a current supplied from the voltage source to the first node.

8. The display device of claim 3, further comprising:

a data compensator to compensate for the data signal supplied to the pixel as a compensation value corresponding to the detected pixel current value.

9. A driving method of a display device comprising a plurality of pixels arranged in a plurality of rows and a plurality of columns, each of the pixels coupled to a corresponding data line from among a plurality of data lines and a corresponding scan line from among a plurality of scan lines, the method comprising:

selectively supplying, by a scan driver coupled to the scan lines, a scan signal to a first scan line coupled to a first pixel and a second scan line coupled to a second pixel, the first pixel and the second pixel being in a same row of the plurality of rows;

applying, by a sensing unit coupled to the data lines, a test signal to a first data line corresponding to the first pixel and to a second data line corresponding to the second pixel, the second data line being adjacent to the first data line;

detecting, by the sensing unit, a first sensing current which is generated by the test signal and corresponds to the first pixel and a second sensing current which is generated by the test signal and corresponds to the second pixel;

generating, by the sensing unit, a first sensing voltage according to the first sensing current and a second sensing voltage according to the second sensing current;

detecting, by the sensing unit, a pixel current of the first pixel when the test signal is concurrently applied to the first data line and the second data line, and the scan signal is supplied to only the first scan line from among the plurality of scan lines to which the scan signal is supplied, by using the first sensing current and the second sensing current;

outputting a pixel voltage corresponding to the pixel current; and supplying, by a data driver coupled to the data lines, a data voltage to the data lines, the data voltage being compensated by a data compensator using a compensation value corresponding to the pixel voltage, wherein the sensing unit comprises:

a first sensing capacitor to generate the first sensing voltage according to the first sensing current, a second sensing capacitor configured to generate the second sensing voltage according to the second sensing current, and a comparator to output a voltage difference between the first sensing voltage and the second sensing voltage as the pixel voltage.

10. The driving method of a display device of claim 9, wherein:

the detecting of the pixel current comprises:

detecting the pixel current by comparing the first sensing current and the second sensing current.

11. The driving method of a display device of claim 9, wherein:

the applying of the test signal comprises:

applying a voltage to an input terminal of an amplifier;

supplying an output voltage generated from the amplifier according to a difference between voltages input to the plurality of input terminals to a gate of a plurality of transistors; and applying the test signal to the data line by using a voltage source coupled to one end of at least one of the plurality of transistors, according to the output voltage supplied to the gate.

12. The driving method of a display device of claim 11, wherein:

the plurality of transistors includes a first transistor of which one end is coupled to a voltage source and another end is coupled with the data line and an input terminal of the amplifier through a first node; and a second transistor of which one end is coupled to the first sensing capacitor in which the first sensing voltage is generated according to the first sensing current and the other end is coupled with the first node.

13. The driving method of a display device of claim 9, further comprising:

compensating for a data signal applied to the pixel as a compensation value corresponding to a detected pixel current value.

* * * * *